Aug. 10, 1926.
C. DE MOOS
1,595,294
FLOATING FILM RACK
Filed March 3, 1923
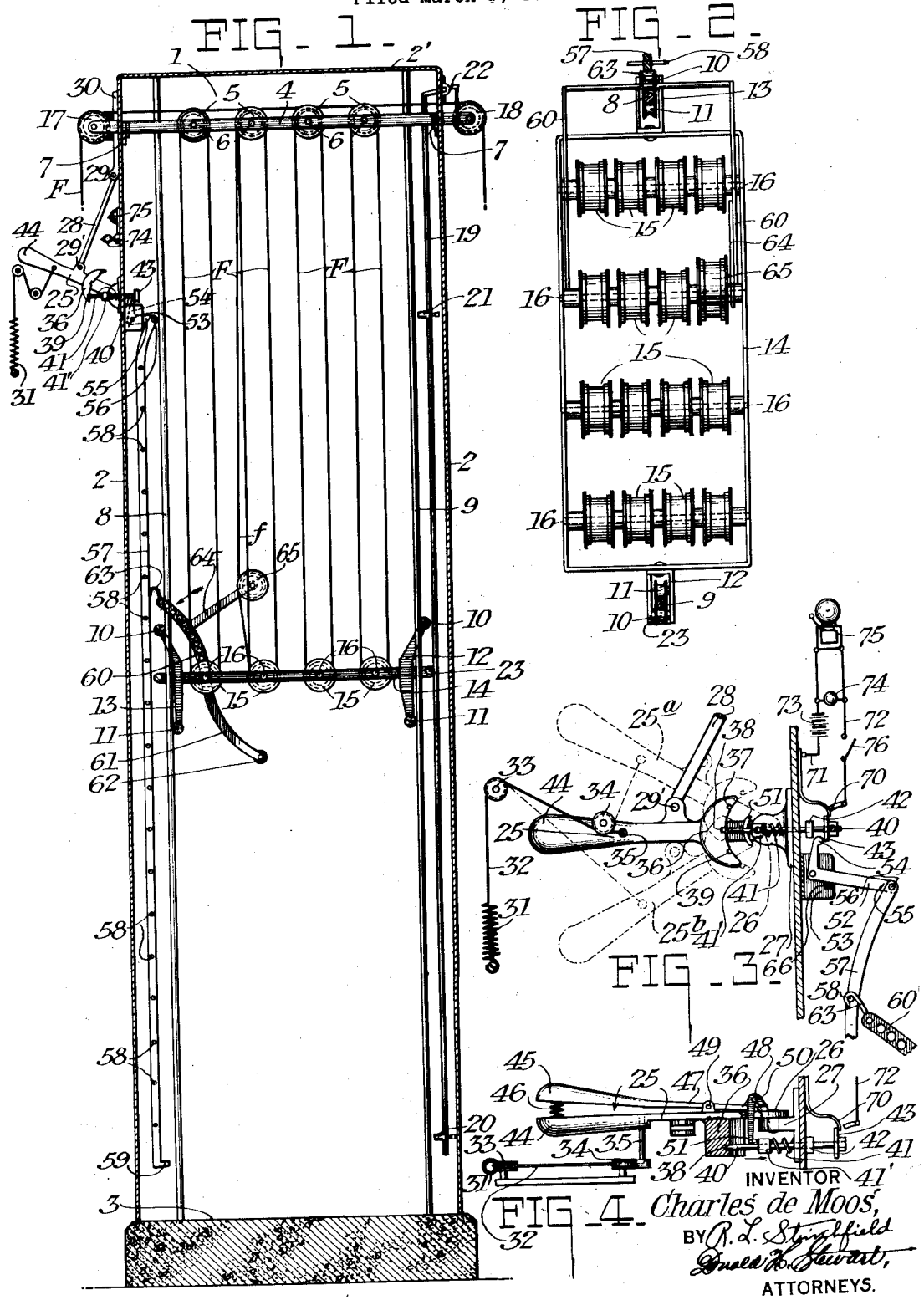
INVENTOR
Charles de Moos,
BY R. L. Stringfield
Donald H. Stewart,
ATTORNEYS.

Patented Aug. 10, 1926.

1,595,294

UNITED STATES PATENT OFFICE.

CHARLES DE MOOS, OF FORT LEE, NEW JERSEY, ASSIGNOR TO EASTMAN KODAK COMPANY, OF ROCHESTER, NEW YORK, A CORPORATION OF NEW YORK.

FLOATING FILM RACK.

Application filed March 3, 1923. Serial No. 622,689.

This invention relates to photography and particularly to film-guiding racks used on continuous film treating machines, being an improvement over the floating film rack shown in my pending application, Serial No. 567,146, filed June 6th, 1922, for photographic film developing machine. One object of this invention is to provide a suitable automatic film stopping mechanism which will function if the film breaks; another object is to provide a device which will prevent the rack from falling when the film breaks; another object is to control automatically the film-feeding mechanism through certain movements of the film rack; another object is to provide an automatic clutch-operating mechanism which may be actuated manually when desired; another object is to retain a number of the film loops in position on the guide rollers when one loop breaks; another object is to retain the floating rack in a loading position after the film breaks or moves out of its proper path; and other objects will appear from the following specification, the novel features being pointed out in the claims at the end thereof.

In my prior application, Serial No. 567,146, I have shown a take-up chamber for purposes fully described therein, with a floating lower film rack adapted to move up or down according to the quantity of film in the chamber. If the film should break, run off a guiding roller, or get out of its normal path, the floating rack would descend with more or less speed, breaking or entangling the film so that few if any loops remain in place on the rollers. My present invention is directed to a device for immediately stopping the film feeding mechanism and holding the rack by a supplemental supporting device until the break can be repaired or the other difficulty overcome. There are a number of advantages in doing this: first, by holding the rack in approximately the position it was in when the film broke, the other loops are retained on the spools, whereas if the rack went to its lower limit of movement the film would become tangled and pulled off the spools; second, a single break can be repaired in a very few seconds and the film started moving again if only the break needs to be repaired; this saving of time may save the film which remains stationary in the treatment tanks while the repair is being made; third, the rack is held in the proper position for rethreading the film, whereas if it went to the bottom of the chamber it would have to be raised and held for rethreading the film; fourth, the rack is not damaged if held from falling; and fifth, no more film is drawn into the baths and thus spoiled when the film is badly broken or when repairs to the spools, film, or the rethreading of the film takes a long time.

In the drawing, wherein like reference characters denote like parts throughout:

Fig. 1 is a section through a portion of a take-up chamber, showing a side elevation of a floating rack, constructed in accordance with and illustrating one embodiment of my invention;

Fig. 2 is a plan view of the rack;

Fig. 3 is a detail side elevation of the clutch-operating mechanism; and

Fig. 4 is a detail, part plan and section of the clutch-operating mechanism.

It is to be understood that the take-up chamber 1 is to be used as an intermediate chamber between several film treatment stations such as between the film developing, fixing and washing tanks as one station, and the tinting, toning and washing tanks as the other station; such a machine being shown in my pending application above referred to, being shown as station C in the drawings in that case.

The size and shape of chamber 1 is not material, so long as it is completely enclosed by side wall 2, a top wall 2', and a floor 3 which will effectually keep out dirt.

In the top of chamber 1 there is a fixed rack 4 supporting a series of film rollers 5 carried on the shafts 6. Rack 4 is here shown as being held in place by the cleats 7 affixed to the side walls 2. This rack is only removed for adjusting or repairing.

Rails 8 and 9 extend from the floor 3 to the top and provide runways for the rollers 10 and 11 carried by the brackets 12 and 13 which support the floating rack 14. This rack consists of a frame carrying a series of rollers 15 on shafts 16, and the rack is free to move up and down on the rails. The rack is entirely supported by the film F which enters chamber 1 over sprocket 17, and makes its exit over sprocket 18, both sprockets being power driven. Thus the film has a definite path over rollers 5 and 15, the only changes in this path outside of the film breaking or running off a roller being in the lengths of the several loops. So long as both sprockets are driven at the same speed the frame remains in approximately the same position, but stopping one sprocket relative to the other, or changing the speed of one relation to the other, causes rack 14 to move up or down.

On the right hand side of Fig. 1 there is a control rod 19, arranged with stops 20 and 21, and connected with a lever 22 which controls a clutch through which sprocket 18 is driven. This feature forms no part of my present invention and is included in my above mentioned application, Serial No. 567,146. It is only necessary here to state that rack 14, through projection 23 which contacts with stops 20 and 21 starts and stops sprocket 18; starting sprocket 18 when rack 14 approaches the bottom of the chamber 1 by contacting with stop 20, and stopping sprocket 18 when projection 23 contacts with stop 21 as the rack 14 reaches the top of the chamber.

It has been found that when the film band breaks in chamber 1 there is a large quantity of film lost, due to the rack falling when its support—the film loops—become loose. As the break is liable to occur when the rack is being raised and more strain is imposed upon the film, the rack is liable to be some distance from the bottom 3. This—the rack moving to the bottom after a break—also greatly increases the difficulty of rethreading the film over rollers 15, because the film loops will be too short to reach the rollers.

To overcome this difficulty I have provided a clutch control lever 25 pivoted at 26 to a bracket 27. An arm 28, pivoted at 29 to a slide 30 actuates a clutch through which sprockets 17 and 18, together with all of the other power driven parts of the machine are operated. Arm 28 is also pivoted at 29′ to lever 25. When in the position shown in full lines, Fig. 3, the parts are not power driven, when in dashed lines at 25ᵃ they are driven at high speed, and when in dash and dot lines at 25ᵇ they are driven at low speed. Lever 25 is normally held in the inoperative position shown in Fig. 3 by a spring 31, to which is attached a cable 32 passing over pulleys 33 and 34 and being affixed at 35 to the lever. As can be seen from Fig. 3, this spring will return the lever to its inoperative position from position 25ᵃ or 25ᵇ.

Lever 25 carries an arcuate block 36 having three apertures 37, 38 and 39. A pin 40, pressed toward the block by a spring 41 tends to enter any one of the apertures. A block 41′ retains the spring in position. A stop 42 limits the movement of pin 40, which also carries the cross head 43. A handle 44 is for manual operation, and has a section 45, pressed from 44 by spring 46, for retracting pin 40 through levers 47 and 48 pivoted at 49 and 50 to the lever 25. Lever 48 terminates in an arcuate head 51 a part of which is always adapted to engage block 41′ when pin 40 is in an aperture—see Fig. 4. Therefore, by bringing handles 44 and 45 together, head 51 thrusts block 41′ and with it pin 40 against the pressure of spring 41 thus releasing the pin 40 from an aperture 37, 38 or 39 and permitting the lever 25 to be manually moved to the desired position to stop or start the entire machine. Pin 40 when in an aperture 37 or 39, holds lever 25 against the action of spring 31.

In order to automatically stop the entire machine when the film breaks in chamber 1, and to prevent rack 14 from falling or descending rapidly to the bottom according to the nature of the film rupture, I provide the following mechanism: A lever 52 is pivoted to bracket 53 and one end 54 engages the cross head 43 of pin 40, while the other end 55 is pivoted at 56 to a trip rod 57. This rod has at frequent intervals, pins or protuberances 58 extending to each side of the rod and terminates near the bottom in a foot 59.

The rack 14 supports a swinging yoke 60 upon one of the shafts 16 supporting the rollers 15. This yoke is balanced by an arm 61 with weights 62 so as to tend to move in the direction shown by the arrow in Fig. 1 bringing the hooks 63 into alignment with pins 58. A bracket 64 on the yoke carries a roller 65 which runs upon a strip of film f. Consequently when a film loop breaks, all the loops will loosen, thus permitting yoke 60 to swing the hooks into contact with a pin 58; the weight of rack 14 drawing down rod 57 thus withdrawing pin 40 from an aperture 37 or 39, and allowing lever 25 to return to its inoperative station, thus bringing to a stop all power driven sprockets. It might also be noted that the same result follows if the film runs off the sprocket and does not break, in other words, if the film leaves its normal path about rollers 5 and 15, the above described mechanism will function. Rod 57, therefore, acts as a supplementary rack support to hold rack 14 from falling, as well as a clutch tripping member.

By actuating lever 25 and throwing out the power drive, the film is prevented from continuing to move through the machine, so that it does not become entangled in the chamber 1, and the end will not be drawn through the machine so as to later require rethreading. By stopping the machine quickly the break can be repaired in a short time before a large number of loops have fallen from the rollers 5 and 15. There is an additional function which rod 57 performs and that is that when lever 52 comes to a stop upon block 66 after actuating the clutch mechanism, rod 57 is held in a fixed position so that the rack is brought to a stop in its downward movement upon rails 8 and 9. This also greatly facilitates repairing the film, as the rack is held in a proper position for the amount of film in the chamber at the time.

When the film breaks it is necessary that it be joined again and the machine started with the least possible delay to prevent injury to the film in the treatment baths on each side of the chamber 1. For notifying an operator of the break or other difficulty the cross head 43 when in the position shown in Fig. 3 wherein it has been actuated by rack 14, makes a circuit through switch member 70, wires 71 and 72, and battery 73, thus lighting the signal lamp 74 and ringing the bell 75. The hand switch 76 may be used to break the circuit while repairs are being made.

It can thus be seen that I have provided a clutch-operating mechanism which can be manually operated and which is automatically actuated if the film in chamber 1 is broken or displaced. The device also holds the rack in position for rethreading such rollers as the film may fall from, and in addition, by stppping the movement of the rack, prevents many of the film loops from leaving their guiding rollers. It is obvious that many changes may be made in the structure of such a device without departing from the spirit of my invention, and I contemplate as within the scope of my invention all such modifications as come within the scope of the appended claims.

Having thus described my invention, what I claim as new and desire to secure by Letters Patent is:

1. In a film treating machine, the combination with film feeding mechanism, rollers to guide a film strip, a floating rack adapted to be supported by the looped film strip, and a supplementary rack supporting device operative only when the film fails to support the rack.

2. In a film treating machine, the combination with film feeding mechanism, rollers to guide a film strip, a floating rack adapted to be supported by the looped film strip, and a supplementary rack supporting device. means controlled by a film loop for supporting the rack by the supplementary suporting device.

3. In a film treating machine, the combination with film feeding mechanism, rollers to guide a film strip, a floating rack adapted to be supported by the looped film strip, a supplementary rack support, a movable member controlled by a film loop for engaging the supplementary film support.

4. In a film treating machine, the combination with film feeding mechanism, rollers to guide a film strip, a floating rack adapted to be supported by the looped film strip, a supplementary rack support, a movable member adapted in one position to engage the supplementary rack support, and means including the film contacting with the movable member to cause the latter to engage the supplemenary support when the film strip breaks.

5. In a film treating machine, the combination with a film feeding mechanism, of rollers for guiding a film band through a definite path, a floating rack adapted to be normally supported by film loops and forming a part of the definite path of the film, a supplementary rack support, and means controlled by the film leaving its definite path for causing the rack to be supported by the supplementary support.

6. In a film treating machine, the combination with a film feeding mechanism, of rollers for guiding a film band through a definite path, the path comprising a series of loops about the guiding rollers, a floating rack carrying guide rollers about which the film is looped to support the rack, a supplementary rack support, a movable member carried by the rack and having contact with a film loop, the film loop normally preventing the movable member from engaging the supplementary rack support, but permitting it to engage the supplementary rack support when the film in any of the loops leaves its definite path.

7. In a film treating machine, the combination with a film feeding mechanism, of rollers for guiding a film through a definite path, a floating rack including rollers for guiding film through a portion of the definite path, a swinging member carried by the rack and normally tending to swing beyond the end of the rack by gravity, a roller carried by the swinging member adapted to contact with a film loop, but being restrained from swinging with the movable member by the film, and being released to swing beyond the rack when the film leaves its definite path.

8. In a film treating machine, the combination with a film feeding mechanism, of rollers for guiding a film through a definite path, a floating rack including rollers for guiding film through a portion of the definite path, a supplementary rack holding member carrying a series of projections mounted in the film treating machine, and a movable member carried by the floating rack and controlled by the film, said movable member being moved to engage the projections of the supplementary rack holding member when any of the film leaves its predetermined path.

9. In a film treating machine, the combination with a power driven film feeding mechanism, relatively fixed rollers, a floating rack, rollers carried by the rack, a series of film loops guided through a path by the fixed rollers and the rollers on the rack, and means, operative when the film fails to support the rack, for stopping the power driven film feeding mechanism.

10. In a film treating machine, the combination with a power driven film feeding mechanism, relatively fixed rollers, a floating rack, rollers carried by the rack, a series of film loops guided through a path by the fixed rollers and the rollers on the rack, means for controlling the film feeding mechanism including a lever normally tending to approach an inoperative position wherein the film feeding mechanism is at rest, means for holding the lever in an operative position in which the feeding mechanism functions, and means controlled by a portion of the film moving from its normal path for releasing the means holding the control whereby the lever will assume its inoperative position stopping the film feeding mechanism.

11. In a film treating machine, the combination with a series of relatively fixed film guiding rollers, of a floating rack having a series of rollers mounted thereon, the rack being suspended by a series of film loops passed about the rollers and being adapted to move up and down according to the length of the film looped about the rollers, a film feeding mechanism including a control member to stop and start the mechanism and a trip rod to simultaneously actuate the control member to stop the mechanism, said trip rod including means for retaining the rack in a fixed position.

12. In a film treating machine, the combination with a film feeding mechanism, relatively fixed film rollers, relatively movable rollers, a supporting frame for the movable rollers including a floating rack, means for retaining the rack in a fixed position when a film leaves a roller.

13. In a film treating machine, a power driven film feeding mechanism, a series of relatively fixed rollers, a series of relatively movable rollers, a floating rack carrying the latter series of rollers, the film being guided through a path by the two series of rollers, means for stopping the power drive when a portion of the film leaves its path by breaking or leaving a roller, said means including a supplementary supporting member for the rack for holding the rack in a fixed position until the film is returned to its proper path about the rollers.

14. In a film treating machine, a power driven film feeding mechanism, a control therefor, a rod associated with the control adapted to be moved a short distance to stop or start the film feeding mechanism, a series of film rollers, a floating rack, the rack being supported by film looped over the rollers, a swinging hook adapted to move into engagement with the rod, a contact carried by the hook and resting upon the film preventing the hook from moving toward the rod, the film releasing the hook when a film loop breaks, thus causing the rod to stop the power drive through the control member and support the floating rack through the hook.

15. In a film treating machine, a power driven film feeding mechanism, a control lever therefor movable to a position to stop and to a position to start the power drive, a rod associated with the control lever and movable through a limited distance, a series of relatively fixed rollers and a series of relatively movable rollers, a floating rack for carrying the latter series of rollers, the film having a definite path in a series of loops over the fixed and movable rollers, the floating rack being supported by the loops, means associated with the rack for engaging the rod associated with the control lever when a portion of the film leaves its path, said means being controlled by a portion of the film band, whereby the control lever is moved to stop the power drive as the rod moves through its limited travel, and the rack is supported by the rod when the latter comes to rest.

16. A control member for film treating apparatus including a control lever movable to and from an operative position in which film is fed to a machine, means for normally holding the lever in an inoperative position, movable means acting against the first mentioned means for holding the lever in an operative position, elements adapted to guide a series of film loops in a definite path, and means controlled by the film leaving its path for actuating the movable means releasing the lever and permitting it to return to its inoperative position.

Signed at Fort Lee, New Jersey, this 27th day of February, 1923.

CHARLES DE MOOS.